United States Patent
Stopczynski

(10) Patent No.: US 6,863,302 B2
(45) Date of Patent: Mar. 8, 2005

(54) SIDE IMPACT AUTOMOTIVE CRASH SENSOR SYSTEM

(75) Inventor: Lawrence Gerard Stopczynski, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 182 days.

(21) Appl. No.: 10/249,109

(22) Filed: Mar. 17, 2003

(65) Prior Publication Data

US 2004/0183281 A1 Sep. 23, 2004

(51) Int. Cl.⁷ .................. B60R 21/32; B60R 21/01
(52) U.S. Cl. .................. 280/735; 180/282; 701/301
(58) Field of Search .................. 280/735; 180/169, 180/271, 282; 701/300, 301; 340/435

(56) References Cited

U.S. PATENT DOCUMENTS 5,339,075 A * 8/1994 Abst et al. .................. 340/903
6,203,120 B1 * 3/2001 Urai et al. .................. 303/125
6,236,926 B1 * 5/2001 Naitou .................. 701/70
6,400,308 B1 * 6/2002 Bell et al. .................. 342/71
6,456,920 B1 * 9/2002 Nishio et al. .................. 701/70
6,671,595 B2 * 12/2003 Lu et al. .................. 701/36

FOREIGN PATENT DOCUMENTS

JP 2000272490 A * 10/2000 ............ B60T/8/24
JP 2001122081 A * 5/2001 ............ B60R/22/46

* cited by examiner

Primary Examiner—David R. Dunn
(74) Attorney, Agent, or Firm—Frank A. MacKenzie

(57) ABSTRACT

A side impact crash detection system (12) for an automotive vehicle (10) is provided that has a side impact sensor (16) that generates a relative closing velocity signal of an object (18). A side slip sensor (24) is positioned within the vehicle and generates a side slip signal corresponding to the side slip of the vehicle (10). A controller (14) is coupled to the side impact sensor and the side slip sensor. The controller (14) generates an object tracking signal in response to the relative closing velocity signal and the side slip signal of the vehicle.

20 Claims, 1 Drawing Sheet

SIDE IMPACT AUTOMOTIVE CRASH SENSOR SYSTEM

BACKGROUND OF THE INVENTION

The present invention relates generally to side impact warning systems, and more particularly, to a method and apparatus for detecting a side impact collision and deploying a device in response thereto.

Collision warning and countermeasure systems are desirable features in an automotive vehicle. Collision warning systems provide the vehicle operator knowledge and awareness of objects or vehicles within a close proximity so as to prevent colliding with those objects or provide the activation of a safety system.

Collision warning systems and countermeasure systems exist in various forms. Certain collision warning systems and countermeasure systems are able to sense a vehicle or object in close proximity to a host vehicle and warn the host vehicle operator, such that the operator can take precautionary steps to prevent collision or injury. Other collision warning systems and countermeasure systems activate passive or active countermeasures such as airbags, load limiting seatbelts, or brake control whereby the system itself aids in preventing a collision.

One way in which to track an object is to use radar. Radar can provide the relative closing speed of an object to the vehicle. One problem with such a device in a side impact system is that the radar may misreport or misclassify an object due to the vehicle slipping sideways (side slip). Because of side slip, the relative velocity for an object may be changed. In a typical system, stationary and low closing rate objects within the sensor scan are sorted and not reported as threatening. Higher closing rate objects are reported and tracked and can become threatening if the system predicts collision of the vehicle with the objects. When vehicle slide slip occurs, non-moving objects may be misreported or misclassified. That is, a stationary object may become a moving object relative to the vehicle. Likewise, object tracking errors and slower system processing time may result from the side slip.

Therefore, it would be desirable to provide an improvement in the detection of a side impact from an object.

SUMMARY OF INVENTION

The present invention provides improved side impact crash detection for an automotive vehicle that compensates for side slip of the vehicle. Consequently, a more accurate prediction of potential collision objects is determined.

In one aspect of the invention, a side impact crash detection system for an automotive vehicle includes a side impact sensor that generates a relative closing velocity signal of an object. A side slip sensor is positioned within the vehicle. The side slip sensor generates a side slip signal corresponding to the side slip of the vehicle. A controller is coupled to the side impact sensor and the side slip sensor. The controller generates an object tracking signal in response to the relative closing velocity signal and the side slip of the vehicle.

In a further aspect of the invention, the object tracking signal may be used to control a side impact safety device. Such a device may include a side airbag or curtain.

In yet another aspect of the invention a method for controlling a side impact system comprises generating a relative closing velocity of an object; generating a side slip signal corresponding to side slip of the vehicle; and generating an object tracking signal in response to the relative closing velocity signal and the side slip of the vehicle.

One advantage of the invention is that processing times can be lowered by preventing objects erroneously being reported as moving objects. This is due to a lower number of objects being classified as moving due to vehicle side slip.

Other advantages and features of the present invention will become apparent when viewed in light of the detailed description of the preferred embodiment when taken in conjunction with the attached drawings and appended claims.

DETAILED DESCRIPTION

Figures 1, 2:
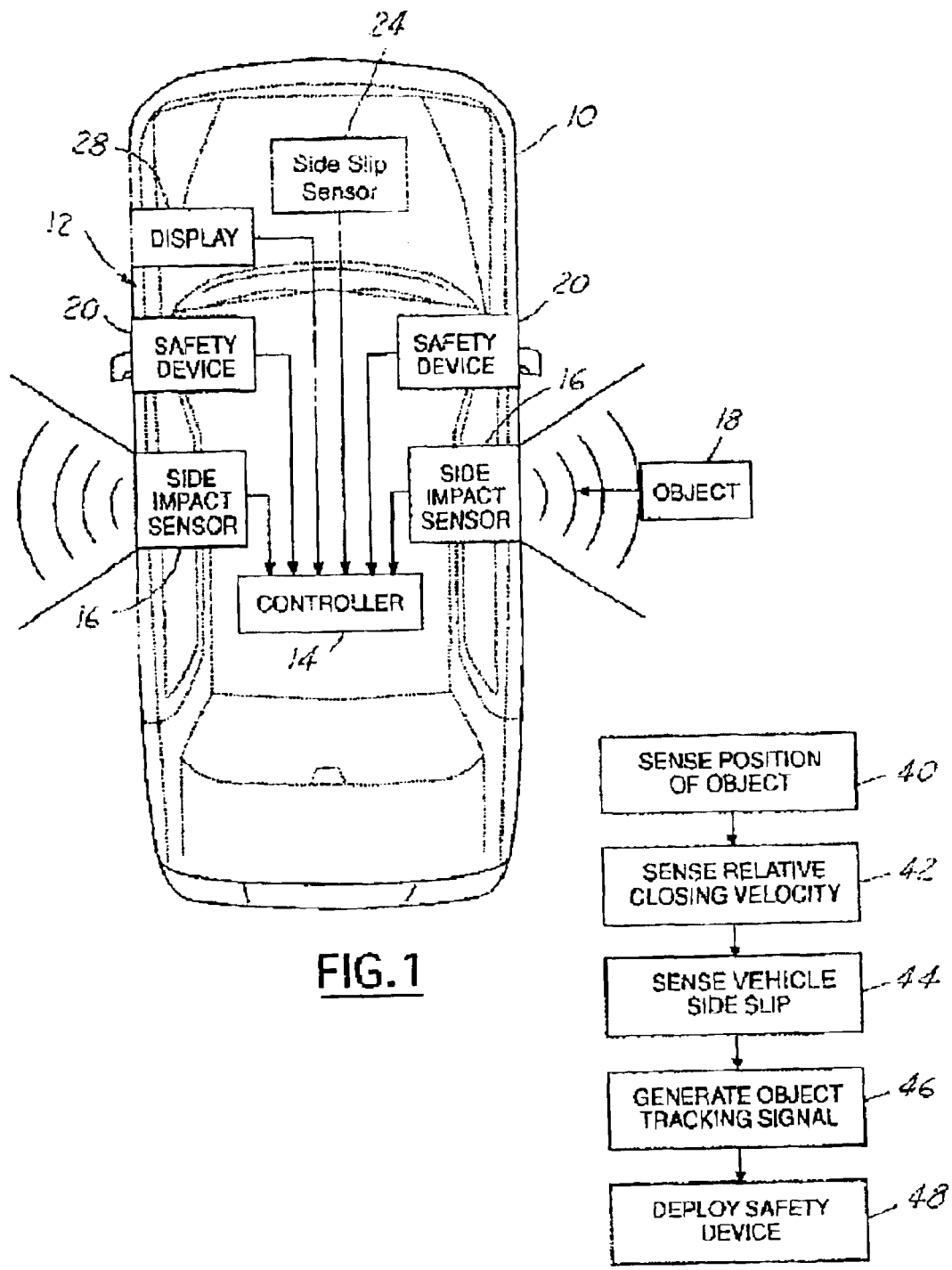
FIG. 1 is a schematic view of an automotive vehicle having a side impact system according to the present invention.
FIG. 2 is a flow chart illustrating the operation of the system according to the present invention.

Referring now to FIG. 1, an automotive vehicle 10 having a side impact crash detection system 12 is illustrated. The side impact crash detection system 12 includes a controller 14 that is coupled to at least one side impact sensor 16 (two of which are shown).

Controller 14 is preferably microprocessor-based and has input/output bus, internal memory, and a central processing unit. Of course, other devices may be used.

Side impact sensors 16 are illustrated located on each side of the vehicle. However, only one side impact sensor is required. Each side impact sensor is directed to detect a closing object 18 on the side of the vehicle. The side impact sensor 16 may, for example, be a radar. More specifically, side impact sensor 16 may include a Doppler radar that provides range rate about the relative velocity of the object 18 to vehicle 10. Of course, other types of side impact sensors such as but not limited to lidar and radar may be suitable.

Controller 14 is also coupled to safety devices 20. Safety devices 20 may, for example, be an airbag. Of course, other impact mitigation devices may be contemplated. For example, internal or external airbags may be deployed by the side impact detection system 12. Also, braking and/or steering control may also be incorporated as part of safety device 20. Side curtain airbags are one example of safety device 20.

Controller 14 is also coupled to a side slip sensor 24. Side slip sensor may be a stand alone sensor or may be incorporated into various types of vehicle systems such as a rollover detection system. Side slip sensor 24 may also be a "virtual" sensor. That is, side slip sensor may generate a side slip signal from various accelerometers positioned within the vehicle. While side slip sensor may itself be an accelerometer, side slip sensor signal may also be calculated from various signals within the vehicle. The side slip sensor 24 gives an indication to lateral movement of the vehicle.

Controller 14 receives the side impact sensor and determines a relative closing velocity signal of the object. The side slip sensor is also provided to the controller and in response to both the side slip sensor signal and the relative closing velocity signal, an object tracking signal is determined. The object tracking signal is thus a compensated relative closing velocity signal for the object. In response to the object tracking signal, controller 14 may generate a screen display 28 to warn the vehicle operator of an impending side impact. In addition to or instead of a screen display 28, the controller 14 may pre-arm safety devices 20 or deploy safety devices 20. In real world situations, various numbers of objects may be tracked at any one time. Advantageously, the present invention will reduce the number of objects tracked since non-moving objects will remain non-moving objects when the side slip of the vehicle is taken into consideration with the object tracking signal.

Referring now to FIG. 2, the method for operating the side impact detection system 12 is illustrated. In step 40, the position of the object being tracked is determined. The relative closing velocity is determined in step 42. In step 44, the vehicle side slip is determined. In step 46, the object tracking signal is generated. The object tracking signal is generated in response to the side impact sensor and the relative closing velocity signal generated thereby and the side slip sensor. In step 48 a safety device may be deployed in response to the object tracking signal that has been corrected for side slip.

While particular embodiments of the invention have been shown and described, numerous variations and alternate embodiments will occur to those skilled in the art. Accordingly, it is intended that the invention be limited only in terms of the appended claims.

What is claimed is:

1. A side impact crash detection system for an automotive vehicle comprising:
    a side impact sensor generating a relative closing velocity signal of an object;
    a side slip sensor positioned within the vehicle, said side slip sensor generating
    a side slip signal corresponding to side slip of the vehicle;
    a controller coupled to the side impact sensor and the side slip sensor, said controller generating an object tracking signal in response to the relative closing velocity signal and the side slip of the vehicle.

2. A side impact crash detection system as recited in claim 1 wherein said side impact sensor comprises a radar.

3. A side impact crash detection system as recited in claim 2 wherein said radar comprises a Doppler radar.

4. A side impact crash detection system as recited in claim 1 wherein said side slip sensor comprises an accelerometer.

5. A side impact crash detection system as recited in claim 1 wherein said controller is microprocessor-based.

6. A side impact crash detection system as recited in claim 1 further comprising a display for displaying an indication corresponding to said object tracking signal.

7. A side impact crash detection system as recited in claim 1 further comprising a second side impact sensor coupled to said controller.

8. A side impact system comprising:
    a side impact safety device;
    a side impact sensor generating a relative closing velocity signal of an object;
    a side slip sensor positioned within the vehicle, said side slip sensor generating a side slip signal corresponding to side slip of the vehicle;
    a controller coupled to the safety device, the side impact sensor and the side slip sensor, said controller generating an object tracking signal in response to the relative closing velocity signal and the side slip of the vehicle, said controller controlling said side impact safety device in response to said object tracking signal.

9. A side impact system as recited in claim 8 wherein said side impact sensor comprises a radar.

10. A side impact system as recited in claim 9 wherein said radar comprises a Doppler radar.

11. A side impact system as recited in claim 8 wherein said side slip sensor comprises an accelerometer.

12. A side impact system as recited in claim 8 wherein said controller is microprocessor-based.

13. A side impact system as recited in claim 8 further comprising a display for displaying an indication corresponding to said object tracking signal.

14. A side impact system as recited in claim 8 further comprising a second side impact sensor coupled to said controller.

15. A side impact system as recited in claim 8 wherein said side impact safety device comprises an airbag.

16. A side impact system as recited in claim 8 wherein said airbag comprises an external or internal airbag.

17. A side impact system as recited in claim 8 wherein said side impact safety device comprises steering control or braking control.

18. A method of controlling a side impact system comprising:
    generating a relative closing velocity signal of an object;
    generating a side slip signal corresponding to side slip of the vehicle; and
    generating an object tracking signal in response to the relative closing velocity signal and the side slip of the vehicle.

19. A method as recited in claim 18 further deploying a safety device in response to the object tracking signal.

20. A method as recited in claim 18 further comprising classifying the object in response to the object tracking symbol.

* * * * *